United States Patent [19]
Bartrug et al.

[11] Patent Number: 5,543,601
[45] Date of Patent: Aug. 6, 1996

[54] MULTIPLE CONNECTION TERMINAL ASSEMBLY FOR AN ELECTRICALLY HEATED TRANSPARENCY

[75] Inventors: Bruce A. Bartrug, Lower Burrell; Harry S. Koontz; John A. Winter, both of Pittsburgh, Pa.

[73] Assignee: PPG Industries Inc., Pittsburgh, Pa.

[21] Appl. No.: 56,979

[22] Filed: May 3, 1993

Related U.S. Application Data

[63] Continuation-in-part of Ser. No. 607,947, Nov. 1, 1990, Pat. No. 5,208,444.

[51] Int. Cl.$^6$ ............................... H05B 3/10; B60L 1/02
[52] U.S. Cl. ...................... 219/203; 219/522; 219/541; 338/322
[58] Field of Search ................................. 219/541, 522, 219/203; 439/845, 849, 850, 877, 878–882, 917

[56] References Cited

U.S. PATENT DOCUMENTS

| | | | |
|---|---|---|---|
| 2,625,640 | 1/1953 | Gaiser et al. | |
| 2,984,816 | 5/1961 | Wallace | |
| 3,496,520 | 2/1970 | Reynolds | 439/442 |
| 3,745,309 | 7/1973 | Gross | 219/203 |
| 3,794,809 | 2/1974 | Beck et al. | 219/203 |
| 4,032,751 | 6/1977 | Youtsey et al. | 219/538 |
| 4,100,398 | 7/1978 | Levin | 219/541 |
| 4,278,875 | 7/1981 | Bain | 219/522 |
| 4,320,286 | 3/1982 | Borrup | 219/549 |
| 4,323,726 | 4/1982 | Criss et al. | 174/68.5 |
| 4,425,021 | 1/1984 | Nicolino | 219/543 |
| 4,610,771 | 9/1986 | Gillery | 204/192.1 |
| 4,682,840 | 7/1987 | Lockard | 439/874 |
| 4,786,784 | 11/1988 | Nikodem et al. | 219/543 |
| 4,808,799 | 2/1989 | Schave | 219/522 |
| 4,820,902 | 4/1989 | Gillery | 219/203 |
| 4,829,163 | 5/1989 | Rausch et al. | 219/547 |
| 4,994,650 | 2/1991 | Koontz | 219/497 |
| 4,997,396 | 3/1991 | Gold et al. | 439/801 |
| 5,040,994 | 8/1991 | Nakamoto et al. | 439/76 |
| 5,089,687 | 2/1992 | Bartrug et al. | 219/203 |
| 5,213,828 | 5/1993 | Winter et al. | 219/203 |
| 5,260,549 | 11/1993 | Garritano | 219/541 |

FOREIGN PATENT DOCUMENTS

| | | | |
|---|---|---|---|
| 2826720 | 1/1979 | Germany | 219/541 |
| 2068715 | 8/1981 | United Kingdom | |

*Primary Examiner*—John A. Jeffery
*Attorney, Agent, or Firm*—Andrew C. Siminerio

[57] ABSTRACT

A multiple terminal assembly includes a plurality of connectors secured within a housing in close proximity to and electrically insulated from each other. The terminals include an electroconductive strip extending outwardly from one side of the housing and an electroconductive tab extending outwardly from an opposite side of the housing. The terminals are spaced apart a fixed, predetermined distance along the housing so that when the assembly is used to supply electrical power to a structure having current carrying members extending to a connection area along an edge portion of the structure, each of the terminal strips is aligned with one of the current carrying members at the connection area and each of the tabs is aligned with a corresponding connector of a multiple connector harness assembly.

10 Claims, 2 Drawing Sheets

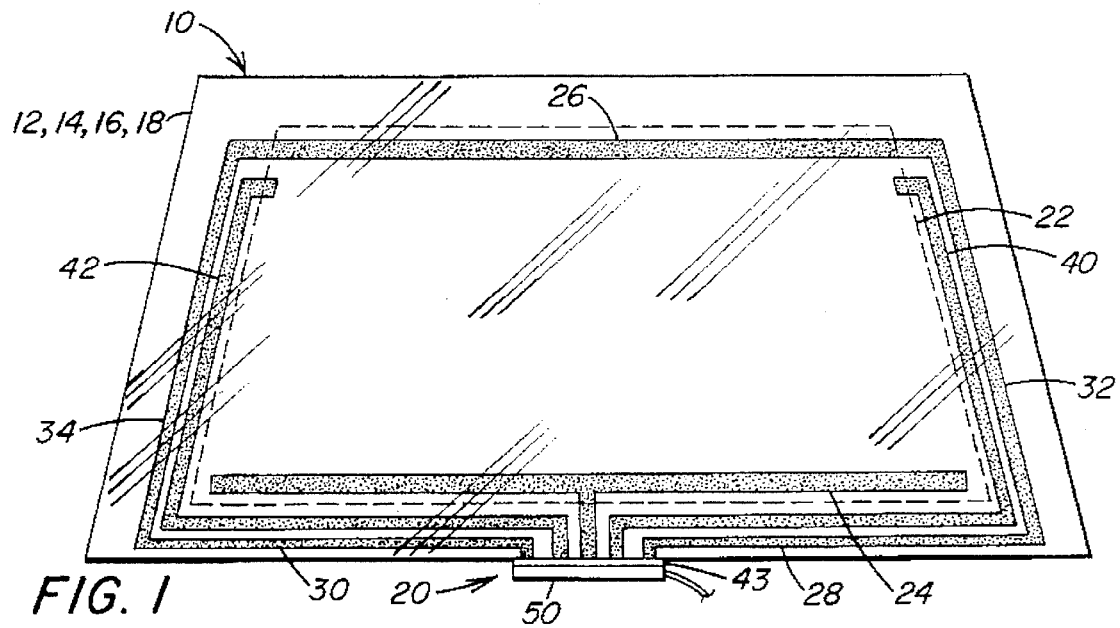
FIG. 1
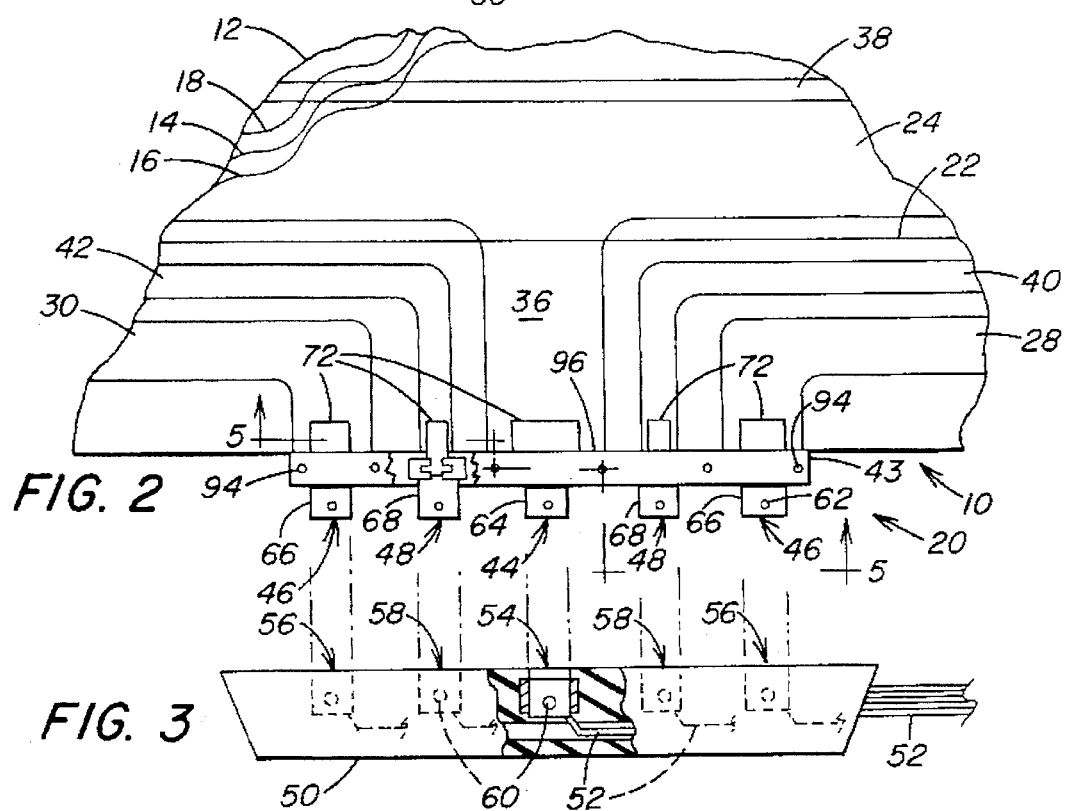
FIG. 2
FIG. 3
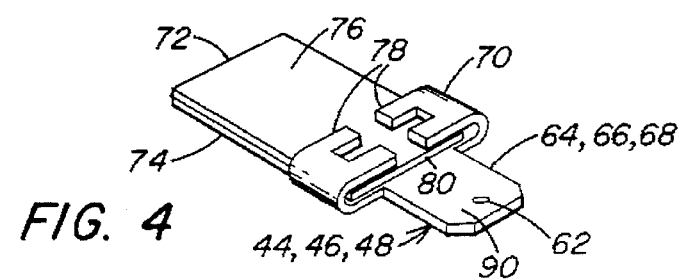
FIG. 4

MULTIPLE CONNECTION TERMINAL ASSEMBLY FOR AN ELECTRICALLY HEATED TRANSPARENCY

This application is a continuation-in-part of Ser. No. 607,847, filed Nov. 1, 1990, now U.S. Pat. No. 5,208,444 to Winter et al., issued May 4, 1993.

FIELD OF THE INVENTION

This invention relates to electrical connectors for electrically heatable transparencies and particularly to an assembly having a plurality of connectors at predetermined spacings for incorporation into a heatable vehicle window.

BACKGROUND OF THE INVENTION AND RELEVANT ART

Electrically heated windows have been used in vehicles to defrost or defog a transparent element comprising the window. An electrical resistance element, preferably in the form of a thin transparent metal or metal oxide electroconductive film on a transparent surface is connected to a source of electric power through a pair of bus bars. The prior art also developed a detector circuit for certain of these heated windows to alert vehicle occupants of a defective condition that may make the heating circuit inoperative, e.g. a crack or other discontinuity in the heating circuit's bus bars.

Prior to this invention, each bus bar was connected individually to a lead line unique for said bus bar, regardless of whether the bus bar was part of a transparent heating circuit for the window or incorporated in a detector circuit. Each bus bar was connected within the outline of the window to the inner end of a first terminal that extended outside the window for individual connection to an external terminal which is connected to a generator or alternator or some other electromotive source. The first terminal was laminated into the window prior to shipment to an assembly plant where each first terminal was separately attached to an external terminal corresponding to each first terminal in a time consuming operation. Some of the developments in this art prior to this invention are recited in a description of various patents that follows.

U.S. Pat. No. 4,100,398 to Levin provides a connective tab 50 of electroconductive metal embedded in an edge portion of a window. An external terminal portion of tab 50 extends outside the edge of the window for connection to a single wire harness when the window is assembled at a vehicle assembly plant. The terminal connections are encased within a sleeve of heat-shrinkable material. While the assembly at a vehicle assembly plant is accomplished in less time than an assembly that involves soldering, this patent requires that a separate connection step be performed for each bus bar.

U.S. Pat. No. 4,278,875 to Bain shows heated aircraft windows in which bus bars 24 and 26 of one embodiment and 48 and 50 of another embodiment extend from opposite sides of one end of the respective windows. Inherently, each bus bar must be secured to an external electroconductive terminal in a separate operation. In U.S. Pat. No. 4,320,286 to Barrup and U.S. Pat. No. 4,323,726 to Criss et al., the ends of bus bars also extend from the outline of windows by a spacing approximating the width dimension of the windshield, which inherently requires a separate connecting step for each bus bar.

U.S. Pat. No. 4,786,784 to Nikodem, et al. shows a heated windshield with a pair of electrical leads that can be attached to connector sections 21 and 23, respectively, for connection to a vehicle's electrical system using separate connecting steps for each connector section. This patent suggests that a portion of glass sheet 14 and intermediate sheet 13 must be cut out in order to provide good solder joint strength between leads 25 and 26 and connector sections 21 and 23.

U.S. Pat. No. 4,808,799 to Schave and U.S. Pat. No. 4,829,163 to Rausch et al. show separate connections for bus bars 28 and 32 of a heating circuit and to sense line 36 of a crack detector circuit, and separate connections 24 and 26 to bus bars 20 and 22 and a sensor terminal 36 for a sensor conductor 34, respectively. Each of these patents needs to make at least three separate exterior connections.

U.S. Pat. No. 4,820,902 to Gillery discloses a dual feed bus bar arrangement for a heated transparency. A jumper wire makes it possible to reduce to two the number of leads extending from the windshield to the power source, but it extends outside the windshield enroute from one lower end to the other lower end of the extensions for the upper bus bar thus exposing the heated windshield to possible breakage of the jumper wire during certain handling steps involved in the fabrication of the windshield, particularly when it includes a roller prepress step. There is no teaching of constructing and arranging the bus bars and their terminal connections to connect them to corresponding terminal connectors for the poles of the electric power source other than separately.

U.S. Pat. No. 5,089,687 to Bartrug et al. reduces the likelihood of breaking the jumper wire by having the jumper wire extend between the ends of the extensions of the upper bus entirely within the margin of the windshield and laminating the entire length of the jumper wire between the windshield's glass sheets. The teachings in this copending application is incorporated by reference in this specification.

BRIEF DESCRIPTION OF THIS INVENTION

The present invention provides a multiple connector assembly and in particular, for use with a heatable transparency. The assembly includes at least two terminals that are secured within a housing in close proximity to and electrically insulated from each other. An electroconductor strip extends outwardly from each terminal from one side of the housing and a tab portion extends outwardly from another side of the housing. The assembly is constructed and arranged so that the spacing between the terminals is such that each strip may electrically contact a distinct current carrying element of the transparency and the tabs are aligned with corresponding receivers of a multiple connector harness assembly so that the harness assembly can simultaneously receive each of the terminal tabs.

The present invention also provides an improved electrically heatable assembly for a vehicle of the type having a first transparent sheet with a terminal connecting area along one edge portion of the heatable assembly, a first bus bar having first electroconductive extension extending along a major surface of the sheet and into the terminal connecting area, a second bus bar having a second electroconductive extension electrically insulated from the first extension and extending along the major surface of the sheet into the terminal connecting area, and an electroconductive heating member extending between and electrically interconnecting said first and second bus bars. The heatable transparency further includes a multiple terminal assembly having at least two terminals secured within a housing in close proximity to and electrically insulated from each other. Each of the terminals includes an electroconductive strip extending outwardly from one side of the housing and an electroconductive tab extending outwardly from a different side of the housing. The terminals are spaced apart a fixed, predetermined distance such that each of the terminal strips is aligned with one of the bus bar extensions and the tabs are aligned with a corresponding connector of a multiple connector harness assembly. The harness assembly includes at least two connectors so that each of the outwardly extending tabs of the terminals may be simultaneously received by a corresponding connector of the harness assembly.

DESCRIPTION OF DRAWINGS

FIG. 1 is a front view of a heatable vehicle window having a heating circuit and optional bus bar discontinuity detecting circuit, incorporating features of the present invention.

FIG. 2 is an enlarged front view of a terminal connection area along an edge portion of the heated vehicle window of FIG. 1, illustrating the multiple terminal assembly of the present invention, with portions removed for clarity.

FIG. 3 is a partial cutaway view of a multiple connector harness assembly shown in spaced aligned relation to the multiple terminal assembly at the terminal connection area of the heatable window and showing how the multiple terminal assembly of FIG. 2 makes simultaneous contact with corresponding connectors of the harness assembly when it engages said edge portion of the window.

FIG. 4 is an isometric view of a typical male terminal connector that may be used with this invention.

DETAILED DESCRIPTION OF THE INVENTION

The particular embodiment of the present invention illustrated in FIGS. 1, 2, 5 and 6 is shown in combination with a heatable windshield having an electric field detector circuit to detect discontinuities in the bus bars as disclosed in U.S. Pat. No. 4,994,650 to Koontz, which teachings are hereby incorporated by reference. The detailed description of this preferred embodiment shows a laminated transparency comprising two plies of glass bonded together by a plastic interlayer typical of present day commercial windshields. However, the invention may apply to heated transparencies having a single ply of glass laminated with a single ply of plastic, all plastic laminations and other combinations involving numerous plies. The transparencies may be used for aircraft windows, windows for other vehicles, and other enclosures.

Figure 5:
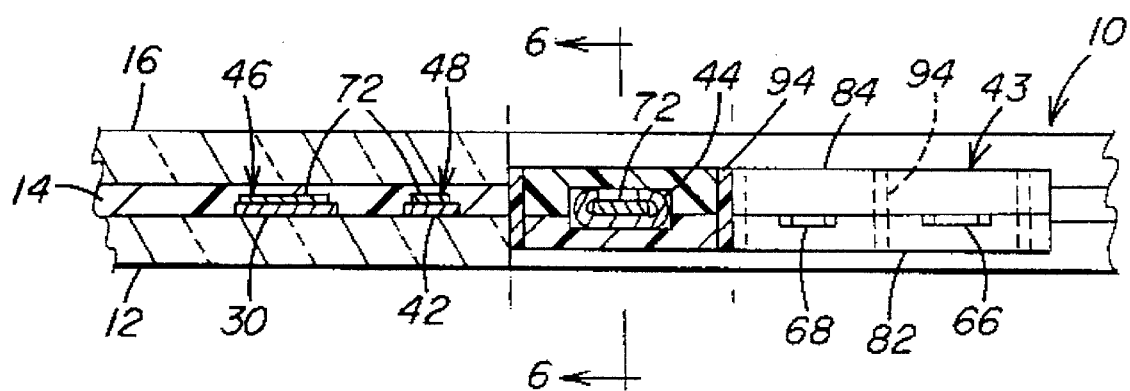
FIG. 5 is a sectional view taken along line 5—5 of FIG. 2.

FIGS. 1, 2 and 5 shows a transparency 10 comprising an outboard glass sheet 12, a plastic interlayer 14 such as plasticized polyvinyl butyral commonly used for laminated windshields or other suitable interlayer material, and an inboard glass sheet 16. An electroconductive coating 18 is preferably placed on an unexposed surface, most preferably on the inbound surface of outer glass sheet 12. Many coatings exhibit the combination of transparency and electroconductivity needed for the heating element of the transparency. A preferred coating comprises a film of silver between films of zinc stannate, disclosed in U.S. Pat. No. 4,610,771 to Gillery, the disclosure of which is incorporated herein by reference. The films are applied by magnetic sputtering in sequence. The silver film acts as a conductive layer, exhibiting appropriate resistivity for a heated windshield when its thickness is on the order of 110 angstroms, while the zinc stannate films mask the reflectance of the silver.

The electrical connections are shown located in a terminal connection area 20 at the central portion of the lower edge portion of the windshield 10. However, the terminal connection area 20 can be located along any edge and at any off-center location, even at a corner portion.

FIG. 2 is partly broken away to show outboard glass sheet 12, interlayer 14, inboard glass sheet 16 and electroconductive coating 18. The coating terminates with a deletion line 22, as shown in FIGS. 1 and 2.

As seen in FIG. 1, a bottom bus bar 24 and a top bus bar 26 are in contact with coating 18. The uncoated margin outside deletion line 22 permits connections to upper bus bar 26 without contact with coating 18. Two conductive strips 28 and 30 extend in opposite directions from terminal connection area 20 along the bottom edge portion of the transparency 10 to electroconductive side strips 32 and 34 which extend along the opposite side portions of the transparency to connect strips 28 and 30 to opposite ends of upper bus bar 26. Strips 28, 30, 32 and 34 comprise electroconductive extension means for upper bus bar 26. A conductive strip 36 extends from bottom bus bar 24 to comprise electroconductive extension means for bottom bus bar 24.

An opaque border 38 is optionally applied by screen printing a ceramic enamel to the inboard surface of either or both glass sheets to conceal attachment means and bus bars incorporated in the transparency.

In transparencies having bus bar discontinuity detector circuits 40 and 42, as disclosed in U.S. Pat. No. 4,994,650, the circuits terminate within the terminal connection area 20 outside the deletion line 22 of coating 18.

Bus bars 24 and 26, crack detector circuits 40 and 42 and electroconductive extension means 28, 30, 32, 34 and 36 are made of well known ceramic frit material containing finely divided silver which may be silk screened onto the glass surface or onto opaque border 38 (shown only in FIG. 2) and fused by heating. The conductivity of the bus bars and the electroconductive extension means is made considerably greater than that of coating 18.

The uncoated marginal areas outside deletion line 22 may be created by masking those areas during the coating process. Optionally, the entire sheet may be coated and the coating subsequently deleted from marginal areas. Since the uncoated marginal areas include the terminal connection area 20 where the electroconductive extension means 28, 30 and 36 and the end of each detection circuit 40 and 42 are located, a terminal can be applied separately to each extension means or each detection circuit (two being shown in the illustrative embodiment) in spaced relation to each other applied terminal. Therefore, each terminal is insulated from each other terminal when the terminals are connected to different bus bars or electroconductive extension means in the terminal connection areas 20.

Referring to FIG. 2, a multiple terminal assembly 43 of the present invention is positioned at area 20 of the transparency 10 to provide electroconductive connection between the heating circuit and crack detector circuits and multiple connector harness assembly 50, as will be discussed later in more detail. More particularly, assembly 43 includes a terminal 44 for electroconductive extension means 36, a terminal 46 for each electroconductive extension means 28 and 30 and a terminal 48 for each crack detector circuit 40 and 42. The details of the construction, arrangement and operation of the assembly 43 and terminals 44, 46 and 48 will be described later.

Harness 50 includes a plurality of wires 52, a different one extending from a different one of several female socket connectors 54, 56 and 58. Female socket connector 54 cooperates with a corresponding terminal 44 of assembly 43 which is secured to electroconductive extension 36 for lower bus bar 24. Each female socket connector 56 cooperates with one of the corresponding terminals 46, each of which is secured to electroconductive extensions 28 or 30 of upper heater circuit bus bar 26. Each female socket connector 58 cooperates with one of the corresponding terminals 48, each of which is secured to corresponding detector circuits 40 or 42, if the latter are included in the heated windshield 10. Instead of having a different lead wire extending from each of said bus bar extensions for individual solder connections to one or more outside circuits, the novel multiple terminal assembly 43 of the present invention incorporates and arranges these terminals in a specific configuration so that the terminals are aligned to make electroconductive connections with extensions 28, 30 and 36 and circuits 40 and 42 and are aligned to make simultaneous connections with corresponding connectors 54, 56 or 58, respectively, carried by the harness assembly 50 shown in FIG. 3.

FIG. 3 shows how female socket connectors 54, 56 and 58 are of channel construction are constructed and arranged with detents 60 to mate with holes 62 of corresponding male terminals 44, 46 or 48, as will be discussed later. Each connector is affixed, preferably by bonding using an electroconductive organic adhesive layer in a manner to be explained later, at terminal connection area 20 of the heated window. The terminals include tab 64 for terminal 44, tab 66 for terminals 46 and tab 68 for terminals 48, respectively, that are constructed to match the channel construction of the corresponding socket connectors 54, 56 and 58, respectively, of harness assembly 50. The spacing between the adjacent terminals 44, 46 and 48 along assembly 43 is identical to the spacing between corresponding adjacent connectors 54, 56, and 58. Tabs 64, 66 and 68 should be sufficiently rigid so as to retain their structural integrity if the harness 50 is repeatedly connected to and removed by the tabs will be discussed later.

Referring to FIG. 4, each of the tabs 64, 66 and 68 extend outward from a wide shoulder portion 70 at an outer end of an electroconductive strip 72. Although not limiting in the present invention, the strip 72 may be tinned copper foil or copper foil reinforced with silver. An electroconductive adhesive 74 (such as Chomerics catalog number CCK-XX-101-0100) covers an inner portion 76 of the strip 72 for adhering it to a corresponding electroconductive extension within terminal connecting area 20 along a lower edge portion of the windshield 10. A removable masking tape (not shown) covers electroconductive adhesive 74 until the terminal is ready to be applied to a corresponding bus bar or bus bar extension means to make an electrical connection between strip 72 and its associated electroconductive extension means.

It is important that each male terminal 44, 46 and 48 be oriented in the proper position relative to each corresponding circuit element and also be oriented properly so that its tab 64, 66 or 68 extends simultaneously into a corresponding connector 54, 56 or 58, respectively. Assembly 43 insures proper alignment of the terminals by integrating all the terminals into a single assembly that is constructed to fix the terminals at a predetermined spacing relative to each other that, in turn corresponds to the spacing between the current carrying members of the transparency 10 at the terminal connector area 20 and the connectors 54, 56 and 58 of harness assembly 50. Aperture 62 in each terminal 44, 46 and 48 receives a detent 60 of corresponding connector 54, 56 and 58, respectively, that insures that each terminal fits snugly with its corresponding connector and yet allows ready separation when desired.

Figure 6:
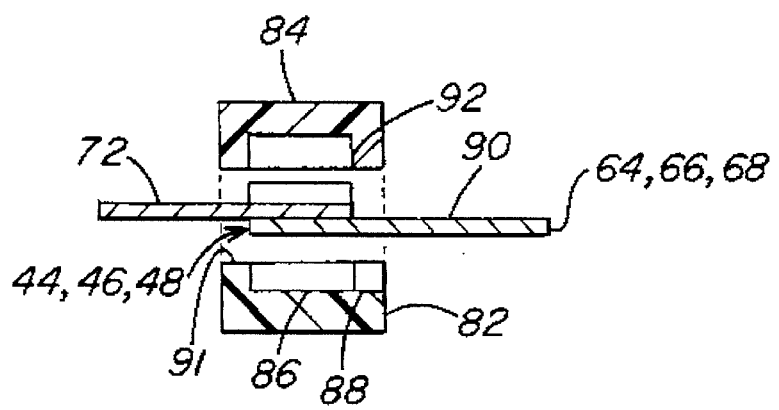
FIG. 6 is an exploded sectional view taken along line 6—6 of FIG. 5.

Although not limiting in the present invention, in the particular embodiment shown in FIGS. 2, 5 and 6, each of the terminals are secured between a pair of lower and upper strips 82 and 84, respectively. The strips should be non-electroconductive and moisture resistant material. The strips should also be heat resistant because the assembly 43 will be subjected to temperature in the vicinity of 300° F. (149° C.) during assembly and lamination of the transparency 10, as will be discussed later in more detail. In a preferred embodiment of the invention, strips 82 and 84 are plastic. Each of the strips 82 and 84 include cavities into which a terminal is positioned. More particularly, lower strip 82 includes cavities 86 (one of which is shown in FIG. 5), each of which are configured to receive the lower portion of one of terminals 44, 46, 48. Channel 88 extends outwardly from cavity 86 to receive tab 64, 66, 68 of a corresponding terminal. Although not limiting in the present invention, the depth of cavity 86 and channel 88 is such that the upper surface 90 of the tabs is flush with the upper surface 91 of lower strip 82. Upper strip 84 includes a corresponding cavity 92 (one of which is shown in FIG. 5) which receives the upper portion of a terminal. It is important that the cavities 86 and 92 are in the correct location to receive the terminals to ensure that the strips 72 of each terminal 44, 46, 48 are aligned with a corresponding extension 28, 30, 36 or detector circuits 40 and 42 while the tabs 64, 66, 68 are aligned to receive the corresponding connectors 54, 56, 58 in harness 50.

Assembly 43 further includes a plurality of pins 94 that extend through strips 82 and 84 and are glued and/or pressure fit in place to hold strips 82 and 84 together and secure the terminals therebetween.

If desired, non-electroconductive adhesives may be used between strips 82 and 84 and/or in cavities 86 and 92 to further seal the assembly 43. The sealants may be any type of moisture and high temperature resistant material of the type disclosed in U.S. Pat. No. 5,213,828 to Winter et al. and in particular Plastilock® flexible epoxy sealant available from B. F. Goodrich Co. and Dow Corning® 982 silicone sealant.

It should be appreciated that other non-electroconductive materials, such as RTV rubber or other moldable material, may be formed around the terminals 44, 46, 48 to construct the multiple terminal assembly 43 of the present invention.

In one particular embodiment of the invention, the strips 82 and 84 are each approximately 4.5 inches long by 0.25 inches wide by 0.063 inches thick (11.43×0.64×0.16 cm) and the terminals are spaced apart at 0.81 inch (2.06 cm) centers.

It should be appreciated that although the embodiment of the invention shown in FIG. 2 positions tabs 64, 66, 68 and electroconductive strip 72 in a generally aligned orientation, it is contemplated that tabs 64, 66, 68 may be offside or angularly offset relative to strip 72.

In the preferred embodiment of this invention, neither glass sheet (the term glass being used to include any transparent glazing material such as transparent plastics such as polycarbonates and acrylics as well as transparent glass) nor flexible interlayer is notched. Also, each terminal of assembly 43 is preferably initially adhered by pressure application through its electroconductive adhesive ply 74 to its corresponding electroconductive extension means of its corresponding heating circuit or its corresponding detecting circuit, if the window incorporates the latter, although connection by the less desired manner of attachment such as by soldering and the like is not ruled out.

It is contemplated that a jumper connection for each circuit may be used, such as shown in U.S. Pat. No. 5,089,687, to make possible the reduction in the number of male terminal connectors required to be incorporated into assembly 43. In addition, the transparency 10 may include only two electroconductive leads as disclosed in U.S. Pat. No. 4,786,784 to Nikodem et al. Thus, for a window having a heating circuit and no detection circuit, a minimum of two terminals 44 and 46 is sufficient for assembly 43, and for a window having both a heating circuit and a detection circuit, the use of jumper connections makes it possible for a terminal assembly containing only three terminals instead of the five terminals shown in FIG. 2.

Although not limiting in the present invention, in one particular embodiment, each terminal used in assembly 43 to electrically connect a heating circuit bus bar or bus bar extension or detector circuit includes a strip 72 of electroconductive material such as copper foil approximately 0.10 mm. thick and 12 mm. long with silver particles embedded in the copper and a layer 74 of electroconductive adhesive on the copper foil with a layer of strippable tape (not shown) protecting said electroconductive adhesive layer 74. If desired, thicker foil or other electroconductive materials may be used for strip 72 provided they do not interfere with the fabrication of the windshield 10, which will be discussed later in more detail. More particularly, it is preferred that the thickness of the strip 72 be no more than the thickness of interlayer 14 after lamination. Tabs 64, 66 and 68 are several times as thick as strip 72, for example, about 0.76 mm., and extend about 9 mm. long from the outer end of each pad. Shoulder portion 70 of each tab includes members 78 which are folded around an exposed end 80 of strip 72, that preferably is free of electroconductive adhesive layer 74, and crimped to connect the end 80 to the tabs 64, 66 or 68. Although not limiting in the present invention, in the particular embodiment shown in FIG. 4, the members 78 are bifurcated to receive solder in the areas therebetween, if required, to secure the tabs to the strips. It should be appreciated that other terminal configurations may be incorporated into the assembly 43.

METHODS OF FABRICATION

Although not limiting in the present invention, a laminated heated windshield incorporating the multiple terminal assembly 43 of the present invention, may be fabricated according to the following steps:

1. Cut a pair of glass sheets in outline to slightly different dimensions so that the outer sheet will be slightly longer than the inner sheet of the pair, wherein the edge outlines match after the sheets are bent in unison.

2. Smooth the edges of the glass sheets by sanding or fire polishing.

3. Pair each outer glass sheet to a corresponding inner glass sheet to form a pair.

4. Screen print a black ceramic enamel band to the marginal portion of what will be the inner surface of the outer glass sheet, hereafter called the #2 surface (the four glass surfaces of the pair of glass sheets being numbered consecutively from the outermost surface of the outer glass sheet (#1 surface) to the innermost surface of the inner glass sheet (#4 surface).

5. Heat the outer sheet to fire and fuse the black enamel onto the #2 surface of the flat outer glass sheet.

6. Screen print the bus bar and detector circuits over the fired ceramic enamel and/or #2 glass surface using a conventional ceramic-silver composition.

7. Heat the outer sheet to fire and fuse the ceramic-silver composition onto the ceramic band and/or glass surface.

8. Apply parting material between the glass sheets to keep the glass sheets separate during a subsequent glass sheet heating and bending operation.

9. Assemble the pair of glass sheets over a bending mold with the larger glass sheet facing the mold and the #2 surface of the larger glass sheet facing upward.

10. Shape the pair of glass sheets while so assembled on said bending mold.

11. Separate and wash the bent glass sheets.

12. Apply a mask to a portion of the #2 surface.

13. Cathode sputter an electroconductive coating on the unmasked portion of the #2 surface.

14. Remove the mask.

15. If desired, apply an insulated jumper bar member(s) that electrically interconnect the ends of the bus bars of the heating circuit and/or the detector circuit, to reduce the number of terminal connectors.

16. Remove the strippable tape protecting adhesive layer 74 from each of the terminals 44, 46 and 48 of assembly 43.

17. Position assembly 43 along the edge of the transparency 10 at terminal area 20 such that each electroconductive strip 72 overlays and is secured to a corresponding electroconductive extension 28, 30 or 36 or detector circuit 40 or 42, with corresponding tabs 64, 66 or 68 extending out from assembly 43 and beyond the outer end of the glass sheet in a predetermined spacing configuration.

18. Apply a sheet of flexible interlayer material over the #2 surface of the outer glass sheet of said pair of bent glass sheets.

19. Assemble the inner glass sheet of said pair of bent glass sheets over said interlayer to form a laminating assembly.

20. Laminate the assembly to form a unitary structure using standard production procedures to adhere the glass sheets to said interlayer as are well known in the art.

After the transparency is laminated, it is preferred that the interface 96 between assembly 43 and transparency 10 be sealed with a non-electroconductive, moisture resistant material (not shown) such as silicone or flexible epoxy of the type discussed earlier. This material is applied along the entire interface 96, i.e. along the outwardly facing surfaces of glass plies 12 and 16 in the vicinity of the terminal area 20 as well as along the edge of the transparency 10.

If it is desired to ship the laminated heated window 10 with a harness assembly 50 to a vehicle assembly plant, the harness assembly 50 is applied over the tabs of assembly 43 as shown in FIG. 1 in such a manner that each tab makes simultaneous engagement with a corresponding connector of the harness.

If the harness assembly 50 is to be applied to the heated window 10 at a later time, e.g. at a vehicle assembly plant, the terminal assembly 43 may be protected by a cover (not shown) that fits over the entire assembly 43.

It should be appreciated that the present invention is not limited to use with a harness assembly housing 50. If desired, individual connection may be made to each of the tabs 44, 46, 48. However, the terminals still must be fixed in a predetermined spacing configuration which corresponds to the positions of the extensions 28, 30 and 36 and crack detector circuits 40 and 42 at terminal area 20.

In conformance with the requirements of the patent statutes, the inventors have described and illustrated the present invention and have recited what is now considered to be a preferred embodiment of this invention. It is understood that various modifications of this described invention will become obvious in the light of the aforesaid description and that the scope of this invention for which patent protection is sought is defined by the claimed subject matter that follows.

We claim:

1. A multiple terminal assembly to electrically interconnect an electrical power source to a plurality of current carrying members extending into a connection area along an edge of a laminated transparency, comprising:

a housing; and a single row of electroconductive terminals secured within said housing in close proximity to and electrically insulated from each other, wherein said terminals are arranged in a generally planar relationship and each of said terminals includes a generally flat electroconductive strip extending outwardly from one side of said housing along a plane and an electroconductive tab extending outwardly from an opposite side of said housing generally along said plane and further wherein said terminals are spaced apart a fixed predetermined distance so as to align each of said terminals with one of said current carrying members at said connection area of said transparency.

2. The assembly as in claim 1 further including a non-electroconductive, moisture and heat resistant sealant positioned between said overlaying housing members to seal said terminals.

3. The assembly as in claim 1 wherein said housing includes a non-electroconductive, heat resistant material molded around portions of said terminals to form a unitary assembly structure and maintain said terminals at said fixed, spaced apart distance.

4. The assembly as in claim 1 wherein said predetermined spacing between said terminals is such that each of said terminal tabs is aligned with a corresponding connector of a multiple connector harness assembly, said connectors being arranged within said harness assembly in close proximity to each other to simultaneously receive each of said outwardly extending tabs of said terminals.

5. The assembly as in claim 1 further including electroconductive adhesive bonded to a major surface of each of said terminal strips to allow said strips to be secured to a corresponding one of said current carrying members.

6. The assembly as in claim 1 wherein said electroconductive strip is a metal foil.

7. The assembly as in claim 1 wherein said transparency is a windshield.

8. In an electrically heatable transparency having a first transparent sheet with a terminal connecting area along an edge of said heatable transparency, a first bus bar having first electroconductive extension means extending along a major surface of said first sheet and into said terminal connecting area, a second bus bar having a second electroconductive extension means electrically insulated from said first extension means and extending along said major surface of said first sheet into said terminal connecting area, an electroconductive heating member extending between and electrically interconnecting said first and second bus bars, and a second transparent sheet laminated to said first sheet, wherein said bus bars, first and second extension means and heating member are laminated between said first and second sheets, the improvement comprising:

a multiple terminal assembly positioned along said edge of said heatable transparency at said terminal connecting area, said terminal assembly having terminals secured within a housing in close proximity to and electrically insulated from each other, wherein each of said terminals includes a generally flat electroconductive strip extending outwardly from one said of said housing along a plane and laminated between said first and second sheets, and an electroconductive tab extending outwardly from an opposite side of said housing generally along said plane and further wherein said terminals are spaced apart a fixed predetermined distance such that each of said terminal strips is aligned with and electrically interconnected to one of said extension means and said tabs are aligned with a corresponding connector of a multiple connector harness assembly having connectors such that each of said outwardly extending tabs of said terminals may be simultaneously received by a corresponding connector of said harness assembly.

9. The heatable assembly as in claim 8 further including a moisture and heat resistant sealant applied along said terminal connecting area to seal said terminal assembly to said heatable assembly.

10. The assembly as in claim 8 wherein said transparency is a windshield.

* * * * *